United States Patent Office 3,562,646
Patented Feb. 9, 1971

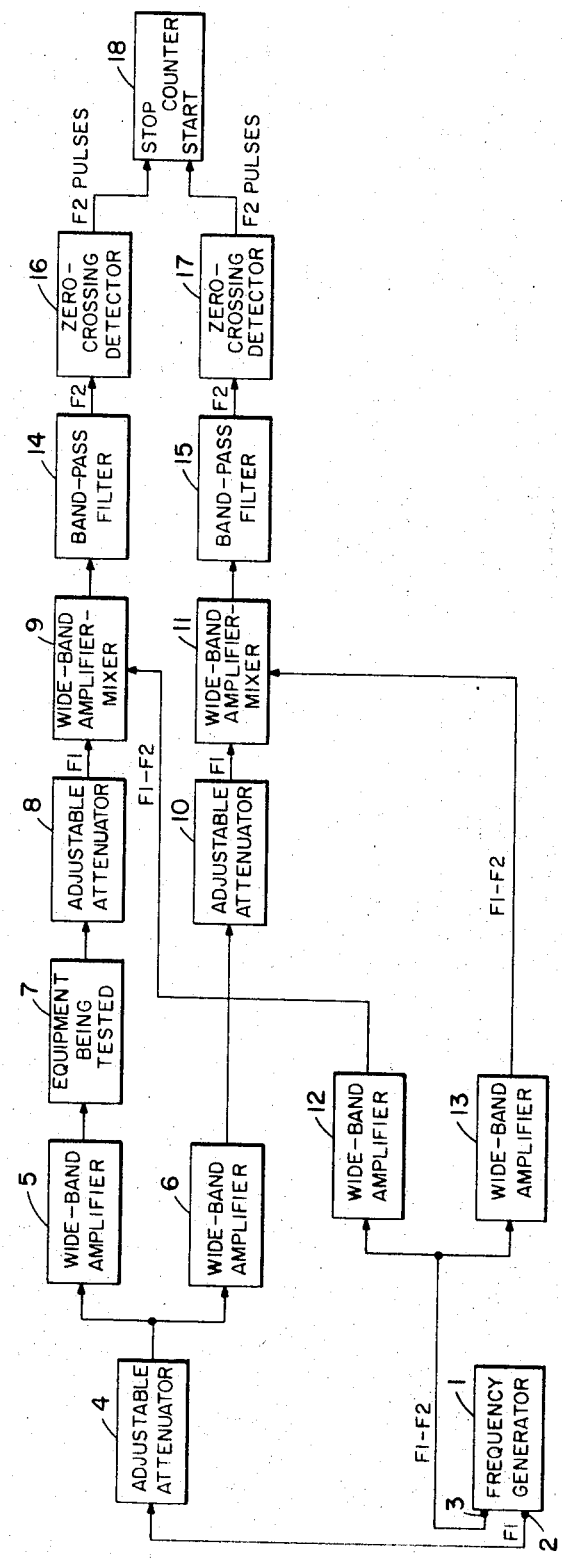

3,562,646
PHASE-MEASURING SYSTEM USING ZERO CROSS-OVERS BETWEEN IDENTICAL FREQUENCY WAVES
Donald E. Maxwell, De Witt, and Douglas R. Houst, Pattersonville, N.Y., assignors, by mesne assignments, to the United States of America as represented by the Secretary of the Army
Filed June 28, 1967, Ser. No. 650,167
Int. Cl. G01r 25/00
U.S. Cl. 324—85           3 Claims

ABSTRACT OF THE DISCLOSURE

A wave generator provides a selected reference frequency wave. A second wave, frequency-locked to and separated from the reference frequency by a predetermined number of hertz, is also provided by the generator. The reference wave is passed through equipment for which a test of the phase-shift is desired. The phase-shifted reference wave is then mixed with the second wave to produce a third frequency wave. The unshifted reference and second waves are also mixed and produce the same third frequency wave. Each of the third waves is squared, then controls a circuit to produce short trigger pulses. These trigger pulses are used to start and stop a digital counter, with the count rate of the counter greater than the frequency of the third waves. The count as displayed by the counter is a measure of the phase-shift of the wave applied to the equipment being tested.

---

Devices for measuring the phase between two like frequency waves are known and are shown, for example, by U.S. Pat. No. 3,096,480, which issued July 2, 1963 to G. E. Pihl. This patent teaches the squaring of two sine-wave inputs. The squared waves are then differentiated, to give short pulses. These pulses are used to cause a flip-flop to alternately charge between its stable states. The output of the flip-flop is read as phase-angle by a meter.

The system of the invention is similar in some respects to the Pihl patent, but is patentably distinct therefrom. The specific circuit of the invention is distinct from the patent circuit. Moreover, the inventive system is used in a different way from the patented device.

The invention consists of a wave generator providing a wide band of frequencies, from which a reference wave at some selected reference frequency may be obtained. Also, a second wave, frequency-separated from said reference frequency by a predetermined number of hertz, is additionally provided by the generator. The reference wave is passed through equipment for which a test of the phase-shift is desired. The phase-shifted wave is then mixed with the second wave to produce a third frequency wave. The unshifted reference and second waves are also mixed and produce the same third frequency wave. Each of the third waves is squared, then controls a circuit to produce short trigger pulses. These trigger pulses are used to start and stop the operation of a digital counter, with the count rate of the counter greater than the frequency of the third waves. The count as displayed by the counter is a measure of the phase-shift of the wave applied to the equipment being tested.

An object of this invention is to provide a novel phase-measuring system.

Another object is to provide a phase-measuring system using a digital phase-angle indicator.

The invention may be best understood by reference to the single figure of drawing, which shows, in schematic form, the system of the invention.

Referring now to the drawing figure, numeral 1 designates a variable frequency generator. The use of a variable frequency generator allows equipment to be tested at various frequencies, dependent upon the circuit of the equipment. Generator 1 has two outputs, designated 2 and 3. Output 2 provides a reference wave F1 from a band of frequencies over which the generator may be varied. Output 3 provides a second wave, frequency displaced from said F1 by the amount F2. Therefore, the wave from terminal 3 is designated F1−F2. F1 is passed through an adjustable attenuator 4 to a pair of wide-band amplifiers 5 and 6. The output of amplifier 5 is applied to the equipment to be tested, designated 7. The wave then passes through 7 and through another adjustable attenuator 8 to a wide-band amplifier-mixer 9.

The output of amplifier 6 is applied through adjustable attenuator 10 to a second wide-band amplifier-mixer 11.

Output 3 of generator 1 is connected to a pair of wide-band amplifiers 12 and 13, with the output of 12 applied to amplifier-mixer 9 and the output of 13 applied to amplifier-mixer 11.

Thus, amplifier-mixer 9 has two inputs applied thereto, one being F1 from attenuator 8, and the other being (F1−F2) from amplifier 12. The mixture of these two inputs produces, among other waves, a frequency wave equal to F2. The output of amplifier-mixer 9 is filtered by band-pass filter 14, which only passes F2.

In a similar manner, amplifier-mixer 11 has two waves applied thereto, F1 and (F1−F2), and yields F2 at the output of another bandpass filter 15. The output F2 of filter 14 may be phase-shifted with respect to F2 from filter 15, since it is derived by a signal passed through equipment 7.

The outputs of filters 14 and 15 are applied respectively to zero-crossing detectors 16 and 17. Detectors 16 and 17 each include amplifying and clipping circuits to "square-up" the F2 waves.

The squared waves are then differentiated, or used to control a trigger, in order to obtain short pulses. These pulses, from 17 and 16 respectively, start and stop a counter 18. Counter 18 counts at a rate greater than the pulses from 17 and 16, and the count may be used as an indication of phase. Ratio correction of the counts may be necessary. The circuits of the detectors 16 and 17 may each take the form as shown in U.S. Pat. No. 3,223,851, issued Dec. 14, 1965, to Kitchens et al.

The operation of the invention should be clear from the above description, but a summary may be in order. Two waves, (F1 and (F1−F2)), frequency separated by a predetermined frequency, (F2), are provided. One wave (F1) is passed through equipment (7) to be tested, then mixed with the other wave (F1−F2). At the same time, the other wave (F1−F2) is mixed with the one wave (F1). Each of the two mixtures produces an output (F2) with one of the outputs possibly phase-shifted, from the passage of its original wave through the equipment (7) being tested. These two output waves (F2) are then squared and converted to short pulses. The pulses are used to control the starting and stopping of a counter 18. Since the counter is counting at a high rate with respect to the pulses, the phase between the pulses is directly proportional to the count shown by the counter.

A counter which may be used in the invention is the Hewlett-Packard HP-5243L.

Equipment 7 could take any one of several forms, or combinations thereof. Such forms could include delay networks, band-pass filter, amplifiers, etc.

While a specific embodiment of the invention has been disclosed, other embodiments may be obvious to one skilled in the art, in view of this disclosure. Changes may be made in components of the invention, without changing the invention. For example, generator 1 may be replaced by two generators, tuned at the same time It is only necessary that the difference between the two frequencies be maintained constant. With high enough signal levels and good regulations, some of the attenuators and/or amplifiers may be unnecessary. Also, generator 1 may be controlled by counter 18, to increase accuracy. These modifications do not change the scope of the invention.

We claim:

1. A system for measuring the phase-shift of a reference wave by an electronic device having an input and an output, said system including: means for providing said reference wave at a first terminal and for providing a second wave at a second terminal, said waves being different frequencies with a constant frequency difference therebetween; first linear connecting means between said first terminal and said input of said electronic device; second linear connecting means; first mixing means having inputs and an output, said output of said device connected to an input of said first mixing means by said second linear connecting means; third linear connecting means; said second terminal connected to another input of said first mixing means by said third linear connecting means; second mixing means having inputs and an output, said second terminal connected to an input of said second mixing means by said third linear connecting means, another input of said second mixing means connected to said first terminal by said first linear connecting means; first and second band-pass filters connected to said outputs of said mixers; a counter having start and stop terminals, a first zero-crossing detector connected between said first band-pass filter and said start terminal, and a second zero-crossing detector connected between said second band-pass filter and said stop terminal.

2. The system as defined in claim 1 wherein each of said zero-crossing detectors includes means for squaring input waves thereto, and trigger means activated by said squared waves.

3. The system as defined in claim 1 wherein said counter counts at a higher frequency than the waves at the outputs of said mixers.

References Cited

UNITED STATES PATENTS

| 3,096,480 | 7/1963 | Pihl | 324—83(A) |
| 3,227,949 | 1/1966 | Oberbeck | 324—57(NBC) |
| 2,595,263 | 5/1952 | Ingalls | 324—85 |

FOREIGN PATENTS

| 701,423 | 1/1941 | Germany | 324—57(H) |

OTHER REFERENCES

Moore, Digital Phase Angle Meter Control, IBM Technical Disclosure Bulletin, vol. 3, No. 2, p. 35 (July 1960).

ALFRED E. SMITH, Primary Examiner

U.S. Cl. X.R.

324—83